UNITED STATES PATENT OFFICE.

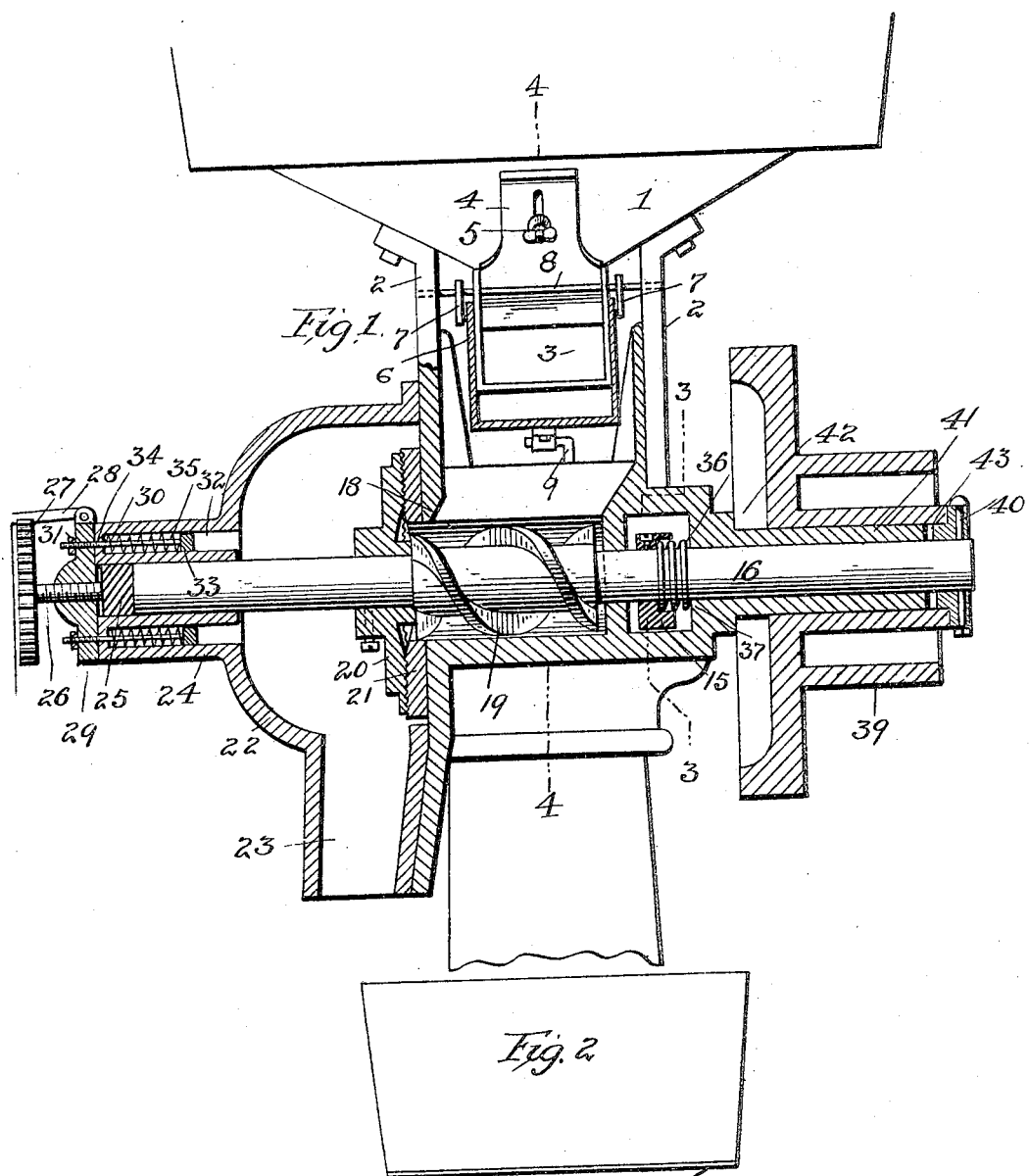

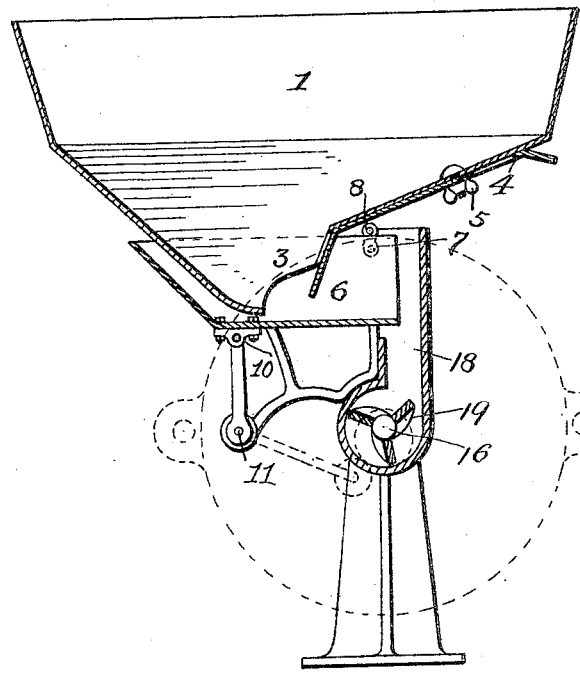
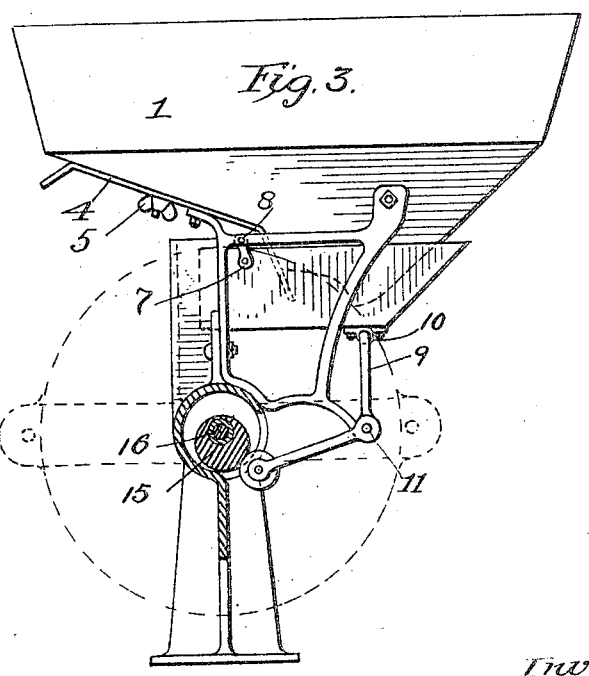

MYRON R. MARTIN, OF SUPERIOR, WISCONSIN.

GRAIN-GRINDING MILL.

No. 817,859.  Specification of Letters Patent.  Patented April 17, 1906.

Application filed May 25, 1901. Serial No. 61,945.

*To all whom it may concern:*

Be it known that I, MYRON R. MARTIN, a citizen of the United States, residing at Superior, in the county of Douglas and State of Wisconsin, have invented certain new and useful Improvements in Grain-Grinding Mills; and I do hereby declare the following to be a full, clear, and exact description of the invention, such as will enable others skilled in the art to which it appertains to make and use the same.

The invention consists in the features and combination and arrangement of parts hereinafter described, and particularly pointed out in the claim.

In the accompanying drawings, Figure 1 is a sectional view longitudinally of the main shaft. Fig. 2 is a detail elevation of the hopper and adjacent mechanism. Fig. 3 is a sectional view on line 3 3 of Fig. 1. Fig. 4 is a sectional view on line 4 4 of Fig. 1.

The matter to be ground is placed in a hopper 1, supported upon suitable brackets 2, forming a part of the framework. The discharge-opening 3 of this hopper is adjustable in size to regulate the flow of material by a slide 4, adjustably secured by a nut 5 to the hopper. From the hopper the material passes into a shaking-receptacle 6, which is supported at or near one end by links 7, depending from a cross-rod 8, fixed in the frame, the opposite end of the receptacle being supported by an arm 9, pivoted thereto at 10 and extending up from a rock-shaft 11, which is journaled in a bearing 12 on the frame, the said rock-shaft having an arm 13 thereon carrying a roller 14, which bears upon a cam 15, fixed to a shaft 16, which is journaled in the frame of the machine and constitutes the main shaft of the apparatus. A spring 17 presses the arm 9, with the receptacle 6, in one direction, while the cam, through connections described, moves the receptacle in the opposite direction, and the shaking movement thus secured will discharge the material into a casing 18, through which the shaft 16 extends. The said shaft within this casing has a feed-screw 19 thereon, which feeds the material to the grinding members, consisting of a disk 20, fixed to the shaft, and a plate 21, fixed to the casing or frame. The ground material passes from these grinding members into a casing 22, fixed to the frame, from which it is discharged through the spout 23. The casing 22 is provided with a boss 24, into which the end of the shaft extends, the said end bearing against the block 25, which may be adjusted to take up wear by means of a screw 26, to which is connected a hand-wheel 27, held in any adjusted position by a latch 28. The screw 26 passes through a cap-piece 29, having rods 30 adjustably connected therewith by means of nuts 31. The rods pass into sockets or recesses 32 in the boss 24 and have heads 33 thereon, against which springs 35 press, the opposite ends of said springs bearing against the end wall 34 of the boss. By this construction the shaft is pressed toward the right in Fig. 1 by a spring-pressure, so as to keep the grinding members in proper grinding relation, but yet to allow the member 20 to yield or move away from the member 21 in case of a hard substance getting between the grinding-faces. In order to keep the grinding-surfaces normally at a slight distance apart while the mill is running empty, I provide a spring 36, bearing at one end against the frame at 37 and at its other end bearing against the cam 15, which is recessed at 38 to receive the spring. The tension of this spring is such as to keep the grinding-surfaces at a slight distance apart while the machine is running empty. The shaft 16 is driven by a pulley 39, connected therewith by a pin 40, the said pulley turning loosely about a hollow projection or boss 41 on the frame, clearance-spaces being left at 42 and 43 to allow the longitudinal movement of the shaft.

By turning the screw 26 the shaft may be adjusted longitudinally to set the grinding-disk 20 in proper relation to the disk 21.

Having thus fully described my invention, what I claim as new, and desire to secure by Letters Patent of the United States, is—

In combination in a grinding-mill, a pair of grinding-disks, a frame or casing having a projecting sleeve, a shaft connected with one of the grinding-disks and passing through the said sleeve, a driving-pulley turning about the said sleeve in contact with the same whereby the said sleeve acts as the bearing for the said pulley, and a connection between the pulley and the shaft consisting of a flanged bushing pinned to the shaft and extending into the hub of the pulley, the said connection serving to drive the shaft from the pulley which finds its support entirely independent of said shaft, substantially as described.

In testimony whereof I hereunto affix my signature in presence of two witnesses.

MYRON R. MARTIN.

Witnesses:
 JAMES WATSON,
 A. E. McMANUS.